No. 897,652. PATENTED SEPT. 1, 1908.
J. E. PAULSON.
MOTION CONVERTING DEVICE.
APPLICATION FILED APR. 10, 1908.
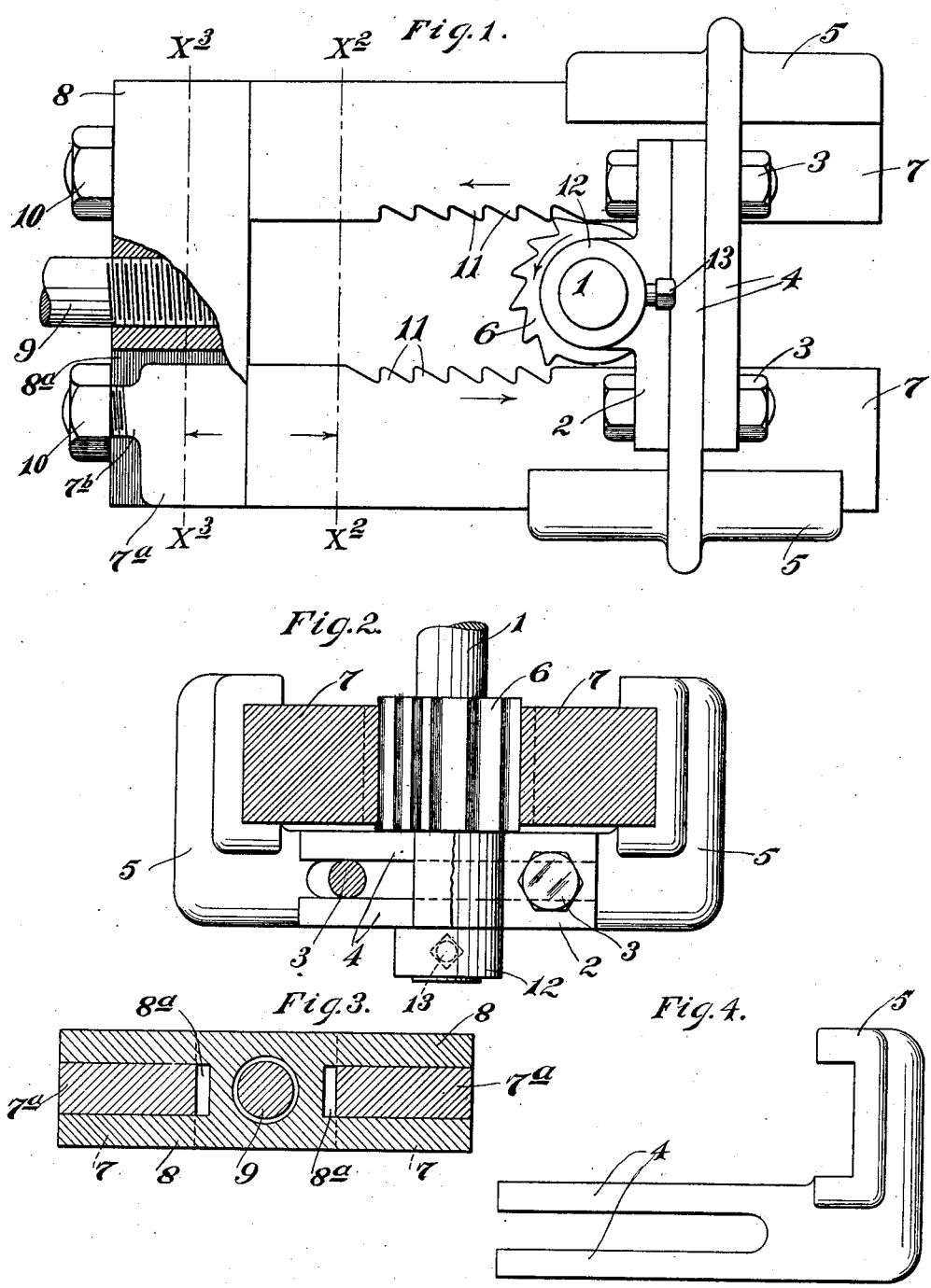
Witnesses:
W. H. Souba.
Harry Opsahl.
Inventor:
John E. Paulson.
By his Attorneys:
Williamson & Merchant

UNITED STATES PATENT OFFICE.

JOHN E. PAULSON, OF FORESTON, MINNESOTA.

MOTION-CONVERTING DEVICE.

No. 897,652.  Specification of Letters Patent.  Patented Sept. 1, 1908.

Application filed April 10, 1908. Serial No. 426,239.

*To all whom it may concern:*

Be it known that I, JOHN E. PAULSON, a citizen of the United States, residing at Foreston, in the county of Millelacs and State of Minnesota, have invented certain new and useful Improvements in Motion-Converting Devices; and I do hereby declare the following to be a full, clear, and exact description of the invention, such as will enable others skilled in the art to which it appertains to make and use the same.

Generally stated, my invention has for its object to provide simple and efficient means for converting rotary motion into reciprocatory motion, or vice versa, and to this end it consists of the novel devices and combinations of devices hereinafter described and defined in the claims.

The immediate object had in view in the designing of my invention, was to provide an improved sickle driving pitman connection for harvesters and mowers and like machines, but the device is probably equally well adapted for application to steam and explosive engines as a means for converting the reciprocatory motion of the piston into continuous rotary motion.

In the accompanying drawings which illustrate the invention, like characters indicate like parts throughout the several views.

Referring to the drawings, Figure 1 is a view in side elevation, with some parts broken away, showing the improved motion converting device. Fig. 2 is a section taken on the line $x^2 \, x^2$ of Fig. 1. Fig. 3 is a section taken on the line $x^3 \, x^3$ of Fig. 1; and Fig. 4 is a detail in side elevation, showing one of the rack guides removed from working position.

The numeral 1 indicates a shaft, which, it may be assumed, is power driven in a constant direction. At one end, the said shaft 1 is journaled in a bearing 2 that is rigidly but adjustably connected by nutted bolts 3 to the overlapped bifurcated prongs 4 of a pair of rack guiding brackets 5. Any suitable means (not shown) may be used to rigidly support the said parts 2, 4 and 5, so as to maintain the shaft 1 for rotation on a constant axis. Close to the bearing 2 the shaft 1 has a rigidly secured segmental pinion 6, the teeth of which are of ratchet-like form and extend less than half way around the same, the remaining peripheral portion of the said pinion being smooth and extended concentric to the axis of the shaft 1.

Mounted to slide in grooves of the guide brackets 5 is a pair of parallel rack bars 7 that are rigidly connected to a head block 8, to the central portion of which, in turn, a pitman rod 9 is rigidly secured. To adjustably connect the said rack bars to the head 8 the latter is provided with slots 8ª at its upper and lower ends, and the said bars are reduced in width at 7ª and are provided with threaded stems 7ᵇ on which work nuts 10. The nuts 10 engage the outer edge of the head 8 and draw the shouldered portions of the rack bars 7 against the front edge of the said head. The opposing inner edges of the rack bars 7 are provided with ratchet-like teeth 11 that are arranged for coöperation with the ratchet-like rack teeth of the segmental pinion 6. By loosening of the nuts 10 it is possible to adjust the teeth of the rack bars for exactly the proper engagement with the teeth of the pinion.

As shown in the drawings, the shaft 1 is held against endwise movement by a collar 12, shown as connected to the outer end of said shaft by means of a set screw 13.

When the pinion 6 is used as the driving member, it must be driven in the direction of the arrow marked thereon in Fig. 1; and, when thus driven, its ratchet-like teeth will engage, alternately, with the upper and lower teeth 11 of the two rack bars and will reciprocate the said rack bars and connected pitman rod 9, first in one direction and then in the other. The teeth 11 in the upper and lower rack bars, it will be noted, are reversely cut, so that they are adapted for driving action in opposite directions, and they are so related to the ratchet-like teeth of the segmental pinion 6 that the advance tooth of the said pinion will engage the first tooth of the lower rack bar, substantially simultaneous with the passing out of engagement of the last tooth of said pinion with the last tooth of the upper rack bar, and vice versa.

By the use of the segmental pinion, and especially by the use of such a pinion with ratchet-like teeth in connection with rack bars having ratchet-like teeth, very simple construction is provided and the parts are brought into compact form with the teeth of the upper bar lying approximately directly over the teeth of the lower bar.

A power transmitting and motion converting device of the kind above described may, as already indicated, be used for a great many different purposes. It is especially adapted for use to convert continuous rotary motion into reciprocatory motion and is thought to afford a very greatly improved substitute for the usual crank and pitman connections used to drive the sickles of harvesting machines and mowers.

What I claim is:

In a device of the kind described, the combination with a shaft and a segmental pinion carried thereby, of a bearing in which one end of said shaft is journaled, a pair of rack guiding brackets having overlapping prongs adjustably secured to said bearing, a pitman rod provided with a head, and a pair of rack bars secured at one end to said head and guided for reciprocatory motion by said brackets, the said rack bars having teeth on their opposing edges for coöperation with the teeth of said segmental pinion, substantially as described.

In testimony whereof I affix my signature in presence of two witnesses.

JOHN E. PAULSON.

Witnesses:
H. D. KILGORE,
MALIE HOEL.